March 26, 1929.  Z. H. BUSH  1,706,913
LOADING AND UNLOADING DEVICE FOR ENDLESS CONVEYERS
Filed June 30, 1927   6 Sheets-Sheet 1

March 26, 1929.　　　　Z. H. BUSH　　　　1,706,913
LOADING AND UNLOADING DEVICE FOR ENDLESS CONVEYERS.
Filed June 30, 1927　　6 Sheets-Sheet 6

Patented Mar. 26, 1929.

1,706,913

UNITED STATES PATENT OFFICE.

ZIMRI H. BUSH, OF GREAT BEND, NEW YORK.

LOADING AND UNLOADING DEVICE FOR ENDLESS CONVEYERS.

Application filed June 30, 1927. Serial No. 202,598.

This invention relates to a loading and unloading apparatus of the power-driven endless-conveyer type in which an endless conveyer of any practicable length is adapted to travel along a suitable guide or track at the same or different levels past one or more stations having means controlled by the traveling conveyer or transferring objects from said station to the conveyer and vice versa.

The main object is to provide means controlled and actuated by the conveyer for transferring the loads from the conveyer cars to the station and also to transfer objects from the station to the cars on the conveyer as said cars are successively presented to the station.

Another object is to provide means whereby the cars on the conveyer may be caused to maintain a substantially horizontal position as the conveyer travels in different directions or at different levels.

Other objects and uses relating to specific parts of the apparatus will be brought out in the following description.

Figure 1:
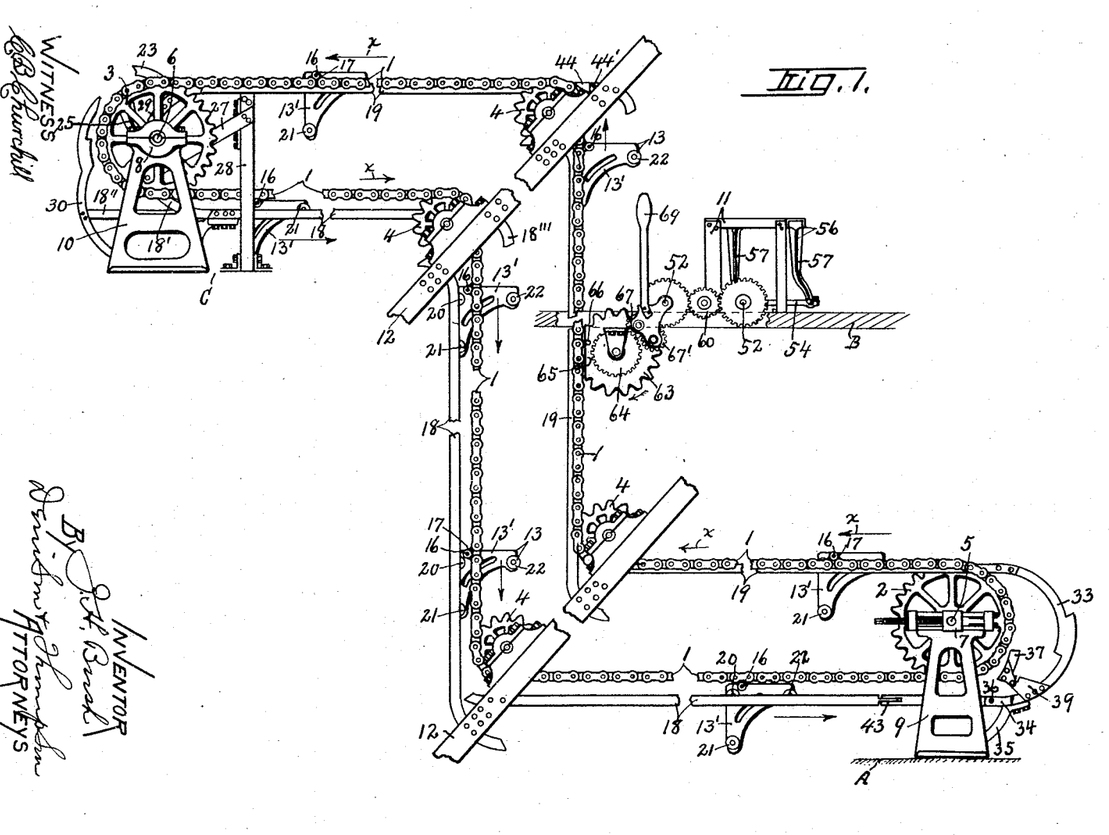
Figure 1 is a side elevation, partly broken away, of an apparatus embodying the various features of my invention.

As illustrated, this apparatus comprises an endless conveyer consisting, in this instance, of two endless chain belts —1— mounted in parallel transversely spaced relation upon suitable end drums or sprocket wheels —2— and —3— and intermediate idler sprocket wheels —4—, the end sprocket wheels —2— and —3— being secured to suitable cross shafts —5— and —6— which, in turn, are journaled in bearings —7— and —8— on upright standards —9— and —10— as shown more clearly in Figure 1.

When the apparatus is used for transferring loads from one floor as —A— to another floor as —B— at a higher level or from the floor —B— to a still higher floor as —C— or from either of said floors to the conveyer, the lower and upper portions of the endless conveyer may travel in a more or less horizontal plane while the intermediate portions may travel in a more or less vertical plane as illustrated in Figure 1 in which case one or more station platforms as —11— may be located adjacent the upwardly traveling portion of the conveyer and inasmuch as the stations will all be alike I have shown only one of them to illustrate the mode of operation of the transferring mechanism at said stations, constructed and operated in a manner hereinafter described.

The intermediate idler sprockets —4— are supported at the turning angle of the sprocket chains —1— upon suitable frame structures —12— forming parts of the main supporting frame and arranged in transversely spaced relation to form open spaces for the travel of the conveyer between them.

The endless conveyer is provided with a series of relatively movable cars —13— arranged in sufficiently spaced relation longitudinally of the chains to permit the operation of the transferring mechanism hereinafter described between them as they travel past the station platform —11—.

Each car is pivotally mounted upon and between the opposite conveyer belts —1— to swing lengthwise thereof and comprises a pair of similar transversely spaced bell-crank levers —13'— rigidly connected to each other by a cross bar —14— and provided along one of its flat sides with a series of parallel lengthwise slats —15— also in transversely spaced relation to receive and support the articles to be conveyed.

Figure 6:
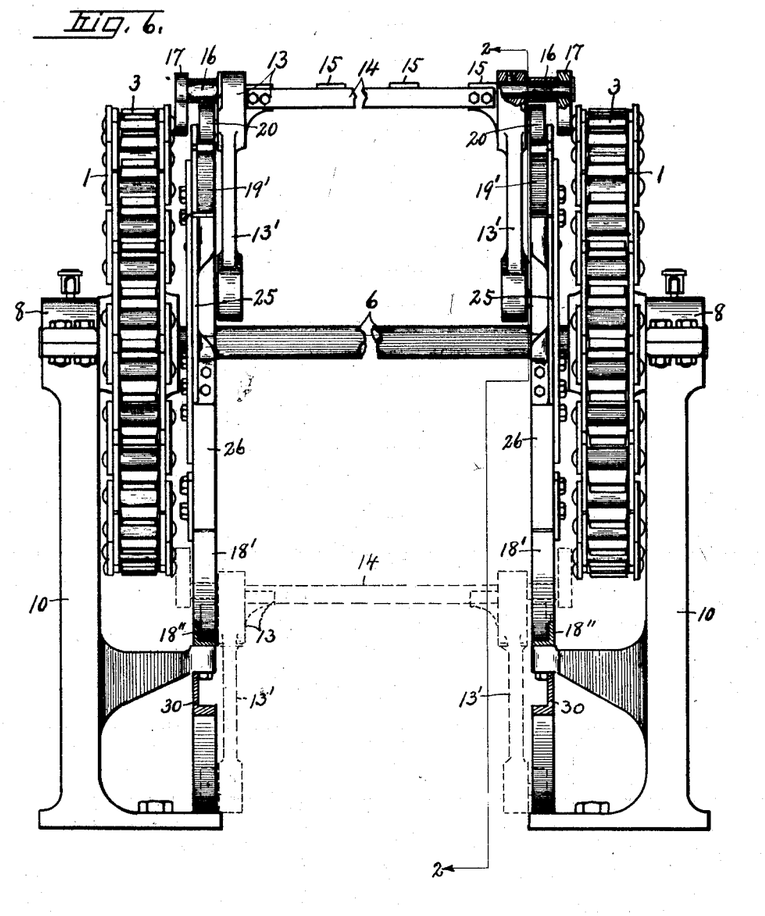
Figure 6 is a transverse vertical sectional view taken in the plane of line 6—6, Figure 2.

The opposite levers —13'— of each car are provided near their angles with outwardly-projecting pivotal trunnions —16— which are journaled in suitable brackets —17— Figure 9 on the inner sides of the adjacent sprocket chains —1— as shown more clearly in Figures 3 and 6 to permit the car with its load carrying surface to remain in a horizontal plane as the conveyer changes its direction of movement along different levels in a manner hereinafter more fully explained.

The opposite sides of the conveyer chains are movable along adjacent tracks —18— and —19— which follow closely the lines of travel of the conveyer chains and are permanently secured to the frame members —12— except as to certain sections of the tracks adjacent one of the standards as —9— to compensate for adjustment of the adjacent drum —2— for tightening the belt and other sections which are necessarily movable to allow for certain turning movements of the cars at the returns of the conveyer belts as will be hereinafter pointed out.

These tracks or guides —18— and —19— are located in parallel vertical planes between the inner sides of the conveyer chains —1— and adjacent bell-crank levers —13'— of the cars with ample clearance to prevent the moving parts from frictional contact therewith.

The opposite ends of each car are each provided with a plurality of, in this instance, three roller bearings —20—, —21— and —22— located respectively adjacent the angles and ends of the lower and upper arms of the corresponding bell-crank levers —13'— and adapted to ride along and upon the tracks —18— and —19— as the cars are carried to different positions by the conveyer chains.

For example, assuming that the conveyer chains and cars thereon are traveling in the direction indicated by arrow —x—, Figure 1, under which conditions the car leaving the drum —2— will have its roller bearings —20— and —22— riding upon the upper horizontal section of the track —19— until it reaches the first upward turn at which point the upper horizontal track —19— will terminate just below the axis of the adjacent idler sprocket wheels —4— while the lower ends of the upright tracks —19— will be extended in curved lines a sufficient distance below said axis to permit the lower rollers —21— of the same car to ride thereon thus bringing the rollers —20— and —21— into contact with the upright tracks —19—.

The rollers —20— and —21— of the car will then ride along the upright portions of the guide tracks —19— until it reaches the upper ends thereof which are curved forwardly and terminate directly below the axis of the adjacent idler sprockets —4— while the upper horizontal sections of the guide tracks —19— would extend rearwardly a sufficient distance below the axis of said idlers to permit the rollers —22— of the car to engage the outer surfaces thereof so that as the car continues to be advanced by the conveyer chains the upper rollers —20— will temporarily open the self-closing track sections —44— and allow both sets of rollers —20— and —22— to ride along and upon the upper horizontal guide tracks —19—, the track section —44— being pivoted at —44'— to swing upwardly from their normal closed positions.

The forward ends of the guide tracks —18— and —19— adjacent the end drum —3— are curved toward each other across the front of the connecting shaft —6— in relatively close proximity thereto and about a radius corresponding approximately to the radius of the pitch circle of the adjacent drum —3— so as to receive and guide the rollers —22— around the return bend as the car travels bodily around the axis of the drum concentric therewith.

A pair of movable track sections —23— are pivoted at —24— to the front ends of the upper horizontal portions of the guide tracks —19— to extend forwardly therefrom in alinement therewith and are provided with rearwardly projecting weighted ends —23'— of sufficient weight to normally elevate their front ends and to bring their rear ends into close contact with the front ends of the upper horizontal track sections —19— to form a continuation thereof as far as the pivots —24—.

These rearward extensions —23'— are of less length than the distance between the rollers —20— and —22— so that when they are in their normal down-positions against the adjacent portions of the guide tracks —19— the rollers —20— will first ride from said tracks —19— on to the weighted ends —23'— of the movable track sections —23— and after passing the pivots —24— will engage the then upwardly projecting forward ends of the sections —23— and depress them to approximately the horizontal plane of the forward ends of the upper track sections —19— thereby elevating the weighted rear ends —23'— between the rollers —20— and —22— which allows the rollers —22— to ride along the forwardly curved ends of the track sections —19— and under the then elevated weighted ends —23'— of the sections —23— thereby keeping the rollers —20— and —22— and upper surface of the car in substantially horizontal position as the car passes over the top of the shaft —6—.

Relatively short stationary track sections

Figure 2:
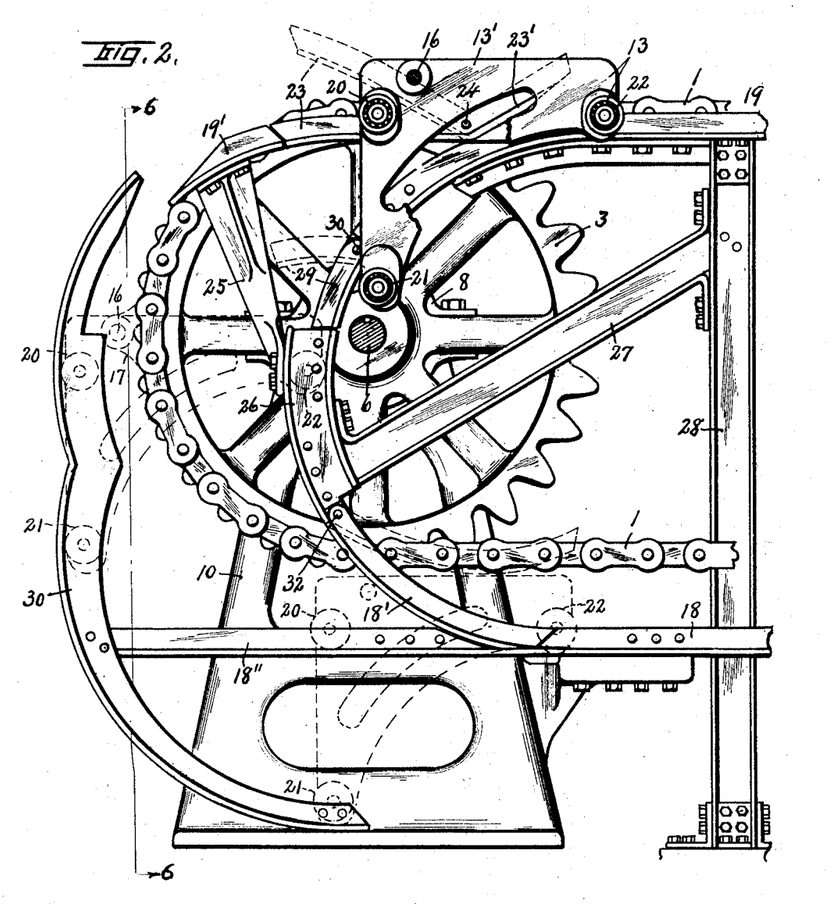
Figures 2 and 3 are enlarged side elevations, partly in section, of opposite ends of the conveyer and adjacent portions of the track showing means for maintaining the cars in horizontal positions.

—19′— are supported by brackets —25— from the rear stationary sections —26— which, in turn, are supported by bracket —27— on upright posts —28— of the main supporting frame as shown more clearly in Figure 2.

These track sections —19′— form continuations of the movable track sections —23— when the latter are in their closed positions to receive and support the rollers —20— and forward end of the car as the latter begins its turn around the axis of the drum —3—.

During this movement of the car along the upper horizontal track sections —19— the lower ends of the front arms of the car, carrying the rollers —21— will move in a plane below said track sections but a sufficient distance above the shaft —6— to clear the same and it, therefore, becomes necessary to provide the front portions of the track in the path of movement of the lower rollers —21—, with relatively short movable sections —29— which are pivoted at —30— to the adjacent downwardly turned ends of the track sections —19— to swing forwardly by the engagement of the rollers —21— therewith so that said rollers may pass to the front of the relatively stationary track section —26—.

These movable track sections —29— are of less length than the distance between the rollers —21— and —22— of the car and are adapted to close by their own weight after the rollers —21— have passed forwardly beyond the free ends thereof thus forming continuations of the downwardly curved forward ends of the track sections —19— to allow the rear rollers —22— of the car to ride along the movable sections —29— and onto the stationary track sections —26—.

Additional track sections —30— are mounted upon the forward end of the frame of the apparatus in lengthwise alinement with the track sections —18— and —19—, the upper portions of the track sections —30— being extended above and below the horizontal plane of the shaft —6— concentric with the rearwardly curved ends of the track sections —29— and —26— for receiving the rollers —20— and —21— on the front ends of the car.

That is, the upper ends of the track sections —30— slightly overlap the front ends of the track sections —19′— but in sufficiently spaced relation thereto to permit the rollers —20— to engage the upper end of the track sections —30— before leaving the front end of the track sections —19′— while at the same time the rollers —22— on the rear end of the car will have engaged in the track sections —26—.

At the beginning of the return movement of the car around the forward end of the drum —3— the rollers —21— and —22— will maintain contact with the track sections —30— and upwardly curved front end sections —18′— of the track sections —18— to hold the car in a horizontal position.

At about the time the front rollers —22— of the car engage the front ends of the track sections —18— the upper front rollers —20— will engage relatively stationary horizontal track sections —18″— forming continuations of the track sections —18—.

The track sections —18′— are hinged at —32— to the lower ends of the stationary sections —26— to permit them to be moved upwardly by the rear rollers —20— of the car as the car continues its movement onto the track sections —18— and, immediately after the rollers —20— have passed the free end of the track sections —18′—, the latter will automatically drop into their normal positions as shown in Figure 2 to form curved continuations of the track sections —18— and 26.

As the car —13— approaches the upper ends of the upright track sections —18—, the rollers —22— will engage the rear upwardly inclined ends of movable track sections —31—, which are similar to the sections —23— and are pivoted at —31′— to a portion of the main frame, thereby tilting the front ends of said sections —31— upwardly to allow the rollers —20— to pass through the openings and thence into engagement with the upright sections —18— during which operation the rollers —22— will have passed onto the short sections —18‴— while the lower rollers —21— will have engaged the upright sections —18—.

The lower ends of the upright track sections —18— and adjacent ends of the lower horizontal track sections are also arranged in overlapping spaced relation and curved in such manner relatively to the axis of the adjacent idler sprocket wheels —4— as to allow the lower rollers —21— to pass between them and below the horizontal sections —18— at which time the passage of the pivotal trunnions —16— concentric around the sprockets —4— will cause the rollers —20— and —22— to engage the upper faces of the lower track sections —18— along which the car will ride until it arrives at a position directly under the drum —2—.

The rear ends of the track sections —18— and —19— are extended beyond the corresponding drum —2— and connected by curved track sections —33— and relatively movable track sections —34— and —34′—.

Suitably curved track sections —35— are secured to the adjacent end of the track sections —18— and —33— to extend downwardly and forwardly therefrom for receiving and guiding the lower rollers —21— as the car begins its movement around the drum —2—.

The movable track sections —34— are hinged at —36— to the adjacent ends of the track sections —18— to swing upwardly and forwardly but normally extend across the upper ends of the track sections —35— to guide the rollers —22— in transit from the track sections —18— on to the track sections —33— and to permit the passage of the rollers —21— from the track sections —35— above the track sections —18— as the car continues its upward movement about the axis of the drum —2—, the track sections —34— being opened by the rollers —21— and are adapted to return to their normal positions by their own weight when released.

Figure 3:
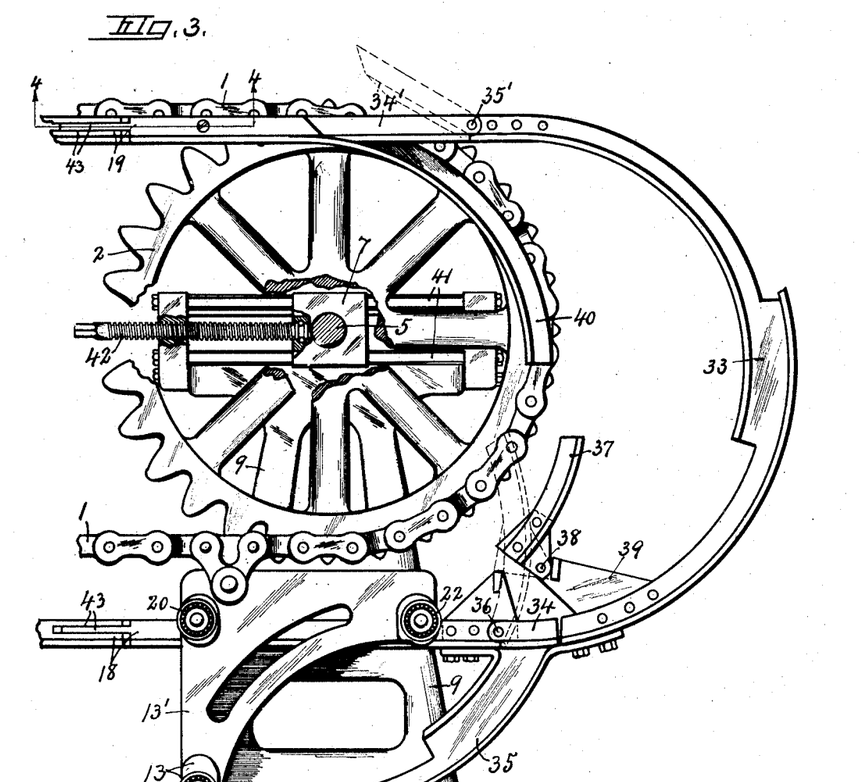
Figure 4:
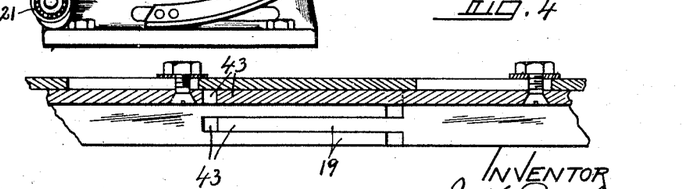
Figure 4 is an enlarged detail sectional view taken in the plane of line 4—4, Figure 3.
Figure 5:
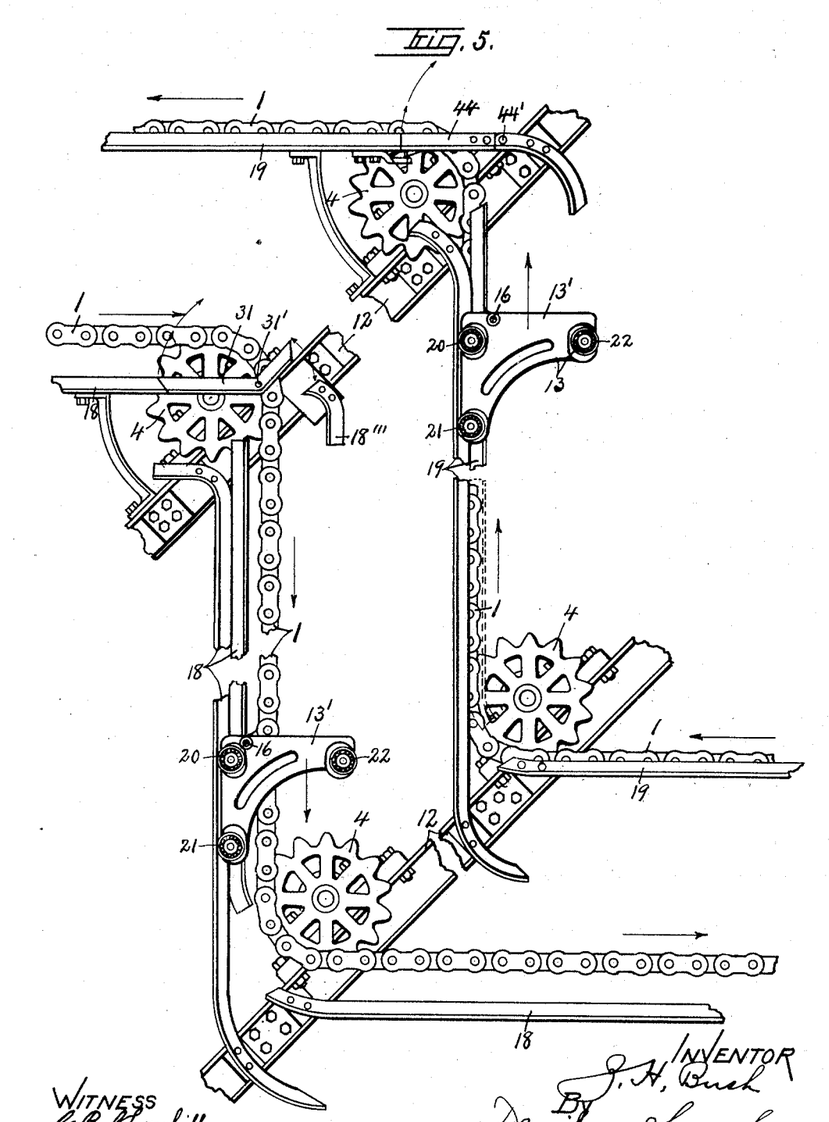
Figure 5 is an enlarged side elevation, partly in section, of the intermediate portion of the conveyer and tracks, showing the means for deflecting the cars from a lower horizontal level to an upper horizontal level.

Additional track sections —37— are pivoted at —38— to suitable brackets —39— on the track sections —33— just above the track sections —34— to form continuations thereof when moved from their normal positions shown by full lines to the positions shown by dotted lines in Figure 3.

The rear rollers —22— of the car maintain contact with the track sections —33— while the car is moving from the lower side to the upper side of the drum —2— while the lower rollers —21— will first open the track sections —34— and then engage the track sections —37— and shift the latter forwardly to the position shown by dotted lines in Figure 3 thereby cooperating with the track sections —33— in holding the car in a horizontal position during the first upward quarter turn around the drum —2—.

As soon as the lower rollers —21— leave the movable track sections —37— the latter will return by their own weight to their normal positions while the upper front rollers —20— will engage and ride upon upwardly and forwardly curved track sections —40— which are secured to the rear ends of the upper track sections —19— to form continuations thereof.

The movable track sections —34'— are hinged at —35'— to the upper front ends of the track sections —33— to swing upwardly and rearwardly and are adapted to be opened by the upper front rollers —20— to permit the latter to pass from the track sections —40— to the rear ends of the track sections —19—.

Now, as the car continues its movement around the upper side of the drum —2— the upper rear rollers —22— will engage and close the track sections —34'— thereby bringing both the upper rollers —20— and —22— onto the upper track section —19— without changing its horizontal position, the lower rollers —21— having previously passed between the adjacent ends of the track sections —37— and —40— and between the sprocket wheels of the rear drum —2— thus completing the cycle of operation of one of the cars which is the same for each car.

*Belt-tightening mechanism.*

The rear bearings —7— carrying the supporting shaft —5— for the sprocket wheels —2— are adjustable along suitable ways —41— by means of screws —42— for tightening the chain belts —1—, said ways —41— being mounted upon the standards —9— as shown more clearly in Figure 3.

In order to maintain fixed relation between the rear track sections —33— and rear sprocket drum, said track sections together with the adjacent portions of the track sections —18— and —19— are also adjustable forwardly and rearwardly and for this purpose are connected to the main track sections —18— and —19— by tongue and groove connections —43— for maintaining continuity of those portions of the tracks along which the car is adapted to travel.

*Transfer mechanism.*

Figures 7, 8, 9, 10:
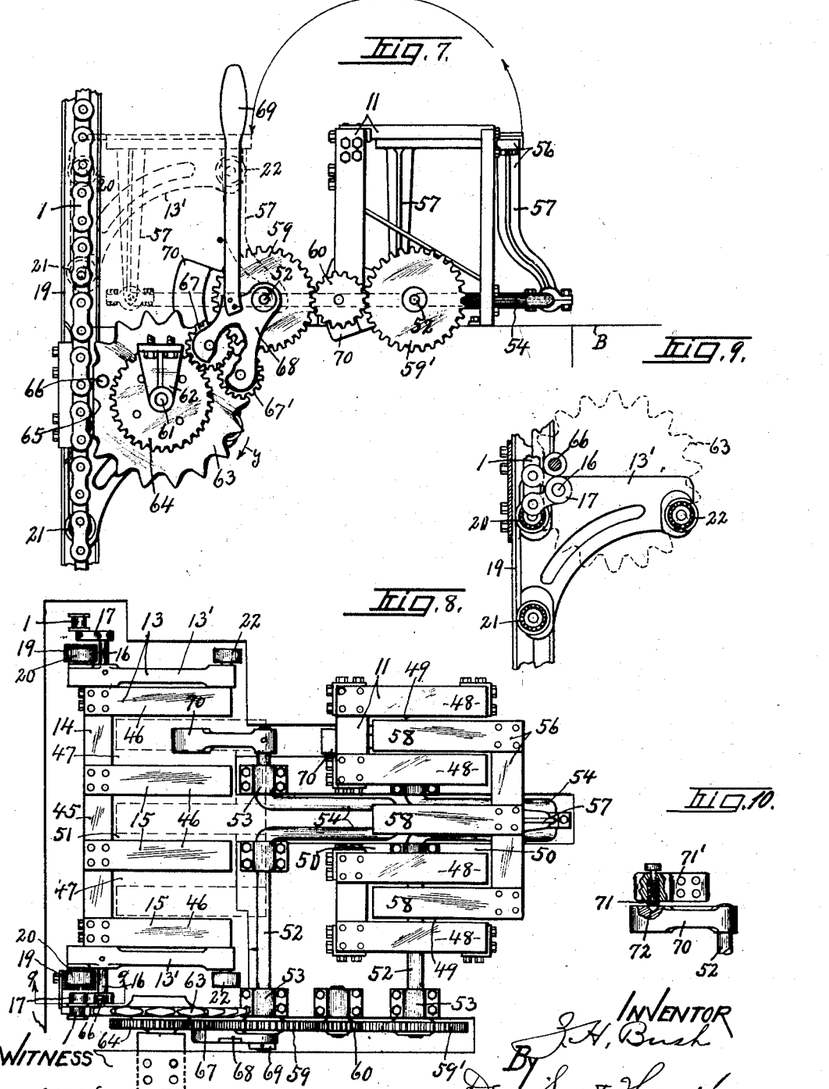
Figure 7 is an enlarged side elevation, partly broken away, of a portion of the upwardly traveling side of the conveyer and one of the stations, together with the means for transferring objects from the conveyer to the station and vice versa.
Figure 8 is a top plan, partly in section, of the mechanism shown in Figure 7.
Figure 9 is an enlarged vertical sectional view taken in the plane of line 9—9, Figure 8.
Figure 10 is a detail sectional view of the means for yieldingly holding the transfer mechanism in its normal position of adjustment.

Any number of station platforms —11— may be installed along the line of travel of one side of the conveyer, one of said platforms being shown in Figures 1, 7 and 8, as installed adjacent the upwardly moving side of the conveyer and preferably upon the floor —B— of a building for receiving articles to be conveyed therefrom to other parts of the building or for receiving articles brought thereto from a lower level of the building.

As previously stated, the top of each car is disposed in a substantially horizontal plane and is provided near its angle with a cross bar —45— to which is secured a series of slats —46— in parallel spaced relation to form intervening vertical openings —47— through which certain portions of the transferring mechanism are adapted to pass in transferring the articles from the platform to the conveyer and vice versa.

The platform —11— is preferably composed of opposite similar upright sections mounted upon the floor —B— in spaced relation and each section provided with a pair of horizontal top bars —48— also in spaced relation to form intervening openings —49— at opposite sides of the central opening as —50—, the openings —49— being disposed in substantially the same vertical planes as the openings —47— in the platform —11— while the central opening —50— is disposed in substantially the same plane as the central opening as —51— in the platform.

A pair of crank shafts —52— are journaled in suitable bearings —53— on the floor —B— near the base of the platform —11— and are provided with U-shaped crank arms —54— extending in the same general direction from their respective shafts —52— in vertical alinement with the central opening —50—, said shafts being extended transversely of the line of travel of the adjacent side of the conveyer —1— and cars —13— and in transversely spaced relation a distance slightly greater than the radial length of their respective crank arms —54—.

A vertically movable carrier —56— is provided with a substantially horizontal top and downwardly projecting arms —57— in transversely spaced relation, the lower ends of said arms being journaled upon the outer ends of the crank arms —54— which serve as a means for supporting the carrier in a substantially horizontal position in all angles of movement of the crank arms and also as the means for effecting a bodily rotary movement of the carrier vertically and transversely from the platform —11— to the cars as the latter are successively presented to the station at which the platform is located for transferring articles from the platform to the cars and also from the cars to the platform as hereinafter more fully explained.

The horizontal top portion of the carrier —56— is provided with a series of bars —58— in parallel spaced relation to form intervening spaces, the outer bars —58— being disposed in the vertical planes of the openings —49— while the central bar is disposed in the vertical plane of the central opening —50— and carries the downwardly projecting arms —57— which are pivotally connected to the crank arms —54—.

The crank shafts —52— are connected to each other at one end by gears —59— and —59'— and an idler gear —60—, the gears —59— and —59'— being of substantially the same diameter to cause their respective crank shafts to rotate at the same speed.

A stub shaft —61— is journaled in a suitable bearing —62— on the floor —B— adjacent one of the upwardly moving sprocket chains —1— and upon this shaft is rotatably mounted a sprocket wheel —63— and a gear —64—.

The sprocket wheel —63— has one side of its peripheral teeth removed or mutilated to form a substantially flat surface —65— which normally faces the adjacent sprocket chain —1— in close proximity thereto when the sprocket wheel is at rest or until actuated by the adjacent sprocket chain —1— in a manner presently described.

The sprocket wheel —63— is provided with a stud or pin —66— adjacent the flat surface —65— and projecting into the path of movement of the brackets —17— on the adjacent side of the chain —1— whereby as each car —13— approaches the sprocket its supporting bracket —17— will engage the pin —66— and rotate the sprocket —63— a partial turn until the teeth of the sprocket below the pin engage in the links of the sprocket chain —1— at which time the movement of the chain —1— will continue the rotation of the sprocket wheel —63— one complete revolution or until the flat side —65— is again presented to the chain.

In like manner, each successive car on the chain will effect one complete rotation of the sprocket wheel —63—, it being understood that the distance between the cars —13— is sufficient to allow this cyclic movement.

This intermittent rotary motion of the sprocket wheel —63— is transmitted to the gear —59— by one or the other of a pair of similar pinions —67— and —67'— which are journaled upon a pivoted yoke —68— having a lever —69— by which the yoke with the gears thereon may be rocked in reverse directions, said yokes being pivotally mounted on the end of the crank shaft —52— carrying the gear —59—.

The object in providing the two pinions —67— is to permit the gears —59—, —60— and —59'— and carrier —56— to be driven in reverse directions as may be required for transferring objects from the conveyer onto the platform —11— or from the platform on to the conveyer.

The weight of the carrier —56— exclusive of any load is counter-balanced by weights —70— attached to their respective crank shafts —52— as shown in Figures 7 and 8.

Any suitable means, such as a spring actuated detent —71— Figure 10 may be mounted on a bracket —71'— upon the floor —B— to yieldingly engage in a socket —72— in one of the counter-weights —70— to stop the carrier —56— and its operating mechanism in a definite position of rest with the upper face of the carrier in a horizontal plane slightly below that of the platform —11— or when the crank arms —54— are in horizontal positions shown in Figures 7 and 8.

The spacing and movement of the cars are so arranged and timed as to cause one cycle of operation of the carrier —56— as the cars are successively presented to the station at which the platform is located.

For example, if it is desired to transfer the articles from the cars to the platform the upper pinion —67'— will be shifted into engagement with the gear —64— which is rotated in the direction indicated by arrow —y—, Figure 7, thereby rotating the crank arms —54— in a clockwise direction and causing a corresponding bodily movement of the carrier —56— in the same direction from its normal starting position at the platform —11— directly under the then upwardly moving car —13— so that by the time the top of the car approaches the horizontal plane of the top of the platform the carrier —56— will have been brought into engagement with the load on the car and by reason of the greater speed of travel of the carrier due to the relatively long sweep of the crank arms —54— the load will be lifted from the car and carried over and upon the platform —11— until it rests thereon, at which time the upper surface of the carrier will have been brought slightly below the upper face of the platform or clear from the load to its position of rest after completing its cycle of movement.

In like manner, loads on the several cars on the conveyer may be transferred from said cars to the platform as the cars are successively presented to the station at which the platform is located.

If it is desired to transfer articles from the platform to the cars on the conveyer the yoke —68— will be shifted to bring the other pinion —67— into engagement with the gear —64— thereby reversing the direction of movement of the crank arms —54— and carrier —56— moved thereon.

That is, assuming that the carrier —56— is in its normal position shown in Figures 7 and 8 and that the direction of motion of the crank arms —54— has been reversed then the carrier will be moved in a counter-clockwise direction indicated by the arrows to pick up and carry the load from the platform —11— over and upon the cars —13— as the latter are successively presented to the station at which the platform is located.

This mechanism for transferring articles from the platform at a fixed station along the line of travel of the conveyer to the cars thereon or from the cars to the platform is particularly simple and expeditious and assures the maintenance of the load in a substantially horizontal position at all angles of travel of the carrier and in like manner the particular arrangement of tracks described and manner of guiding the cars thereon affords a simple method of holding the load-carrying surfaces of the cars in horizontal planes which greatly facilitates the transfer of the articles from the platform to the conveyer and vice versa.

It is evident, however, that the construction of the tracks and cars and also the detail construction of the transfer mechanism may be modified according to different requirements for conveying articles from one place to another without departing from the spirit of this invention.

What I claim is:—

1. In a loading and unloading device for endless conveyers having cars movable therewith past a relatively fixed station for receiving and carrying the articles to be conveyed, an article-supporting platform at said station adjacent the path of movement of the cars, a carrier movable from the platform into and out of the path of movement of the articles on the cars as the latter are successively presented to the platform, and means actuated by the conveyer for operating the carrier through one cycle as each car moves past the platform for transferring articles from the cars to the platform, said means including mechanism for reversing the direction of motion of the carrier for transferring articles from the platform to the car as the latter are successively presented to the platform.

2. In a loading and unloading device for endless conveyers having cars mounted thereon uniform distances apart lengthwise thereof for receiving articles to be conveyed, said cars being provided with slots extending therethrough from their outer ends, a carrier located at a station adjacent the path of movement of the cars and movable through an arc intersecting the path of movement of said cars as the latter pass said station and provided with arms movable through the slots in the cars for loading and unloading articles upon and from each passing car, and means actuated by the conveyer for operating the carrier, including means operable at will for reversing the direction of movement of the carrier.

3. A loading and unloading device for endless conveyers having a portion thereof movable from the lower level to an upper level, cars pivoted to the conveyer in spaced relation lengthwise thereof to swing relatively thereto for receiving and supporting articles to be conveyed, means cooperating with the cars for maintaining them in a substantially horizontal position as they are moved to different positions by the conveyer, a carrier located at a station adjacent the upwardly moving portion of the conveyer and movable through an arc intersecting the path of movement of the passing cars for removing articles from said cars as they are successively presented to said station, and means actuated by the conveyer for operating the carrier, said means including a device for reversing the direction of motion of the carrier to cause it to convey articles from the carrier on to the cars as the latter pass said station.

In witness whereof I have hereunto set my hand this 18th day of June, 1927.

ZIMRI H. BUSH.